United States Patent [19]
Daughenbaugh et al.

[11] 3,740,520
[45] June 19, 1973

[54] APPARATUS FOR MAKING CIRCULAR WELDS

[75] Inventors: Eli M. Daughenbaugh, Prospect Park; Thomas R. Platt, Narberth, both of Pa.

[73] Assignee: Westinghouse Electric Corporation, Pittsburgh, Pa.

[22] Filed: Feb. 3, 1972

[21] Appl. No.: 223,256

[52] U.S. Cl.............. 219/60 A, 219/125, 219/130, 219/137
[51] Int. Cl............................................ B23k 9/02
[58] Field of Search.................. 219/125, 130, 137, 219/60 A, 60 R, 61; 314/129

[56] References Cited
UNITED STATES PATENTS

| | | | |
|---|---|---|---|
| 3,159,734 | 12/1964 | Cooksey et al. | 219/125 R |
| 3,230,343 | 1/1966 | Nagy | 219/130 |
| 3,345,494 | 10/1967 | Apblett, Jr. et al. | 219/125 R |
| 2,938,106 | 5/1960 | Hawthorne | 219/125 R |

Primary Examiner—J. V. Truhe
Assistant Examiner—L. A. Schutzman
Attorney—A. T. Stratton, Donald R. Lackey and John L. Stoughton

[57] ABSTRACT

An apparatus for making circular welds as for example welding tubes to tube sheets in which the electrical conductors and gas lines do not rotate with the welding head.

10 Claims, 5 Drawing Figures

APPARATUS FOR MAKING CIRCULAR WELDS

BRIEF SUMMARY OF THE INVENTION

The welding apparatus of the invention supplies the welding current to the rotating arcing member through a mercury filled chamber to eliminate the troubles inherent with slip rings and brushes and supplies the shielding gas to the rotating spindle through a circumferential groove to a chamber in the spindle and thereafter discharges through an annular discharge path surrounding the tungsten arcing member.

BRIEF DESCRIPTION OF THE DRAWINGS

For a better understanding of the invention reference may be had to a preferred embodiment exemplary of the invention shown in the accompanying drawings in which.

DETAILED DESCRIPTION OF THE INVENTION

Figure 1:
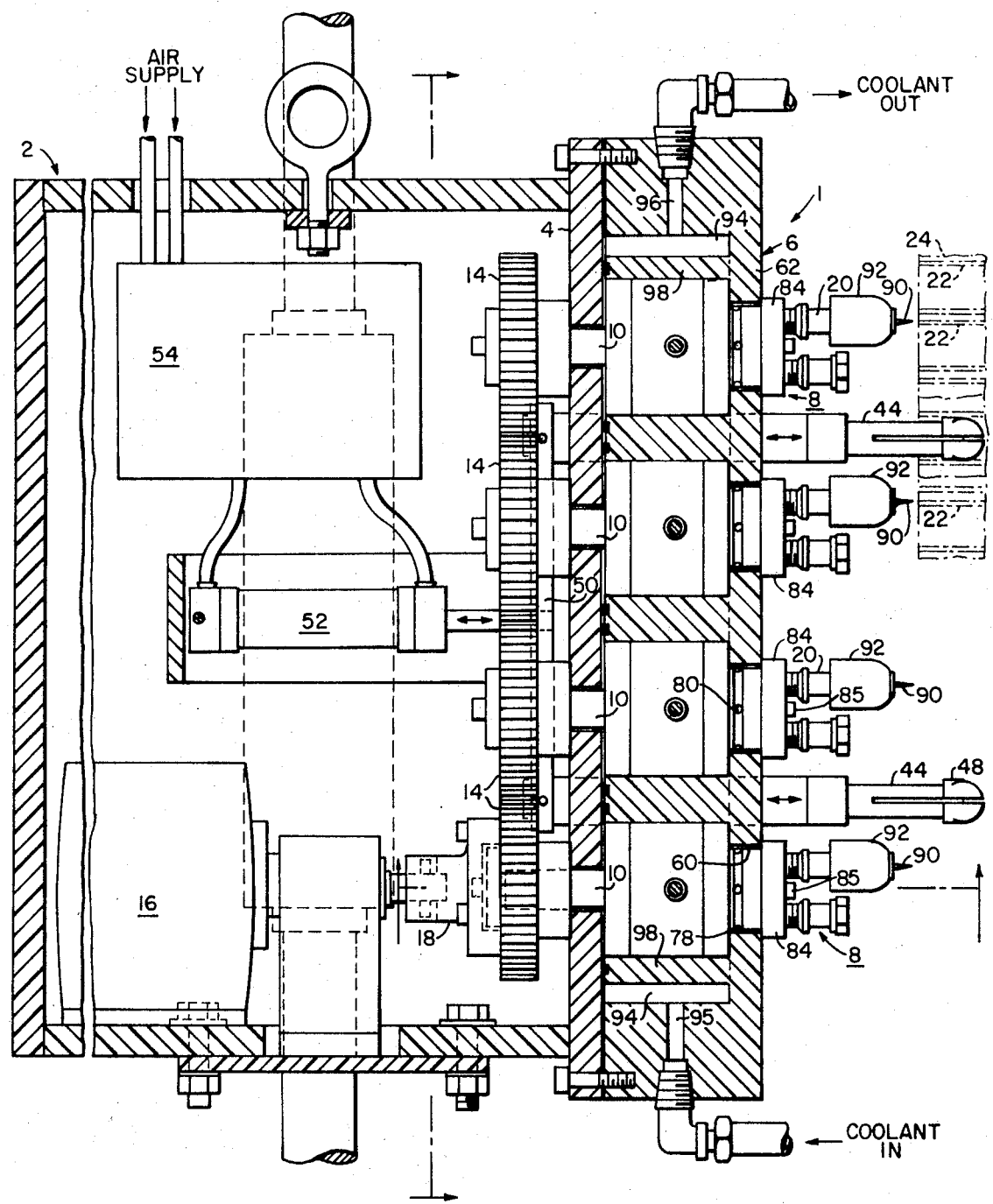
FIG. 1 is a view in substantial vertical cross section of a welding head embodying the invention.

Referring to the drawings by characters of reference, the number 1 indicated generally a multiple spindle welding head having a box like enclosure 2 having a wall 4 to which is secured a chambered housing 6 in which a plurality of cylindrical spindles 8 are journaled for rotation. The material from which the housing 6 and the wall 4, together, with that of certain further parts as will be brought out below, should have electrically insulating properties whereby the spindles may be energized from individual electrical sources. The spindles 8 are provided with extensions 10 which extend outwardly from one end portion thereof through apertures 12 in wall 4 into the apertures 12 in wall 4 into the enclosures 2. A gear 14 is secured to each of the extensions 10. The gears 14 intermesh to form a gear train which is driven by a motor 16 coupled to the lowermost gear 14 by a coupling 18.

A plurality of TIG welding heads 20 are individually secured to the other end portion of the spindles 8. The heads 20 are radially spaced relative to the axis of rotation of the spindles 8 by a dimension which approximates the radius of the outer diameter of the tubes 22 whereby the locus of the arcing tips 23 of the heads 20 will substantially follow the periphery of the tube 22 which is being welded thereby to the tube sheet 24.

Only a portion of the tube sheet 24 and of the tubes 22 are illustrated. It is to be understood, however, that, as is the usual practice, the tube sheet 24 may be upwards of 7 feet in diameter and contains thousands of equally spaced holes. Each hole receives an end portion of a tube 22 and such end portion must be individually TIG welded about its periphery. Typically, the holes will be from five-eighths to seven-eighths of an inch in diameter and will have their centers spaced apart a distance somewhat in excess of the hole diameters.

Figure 4:
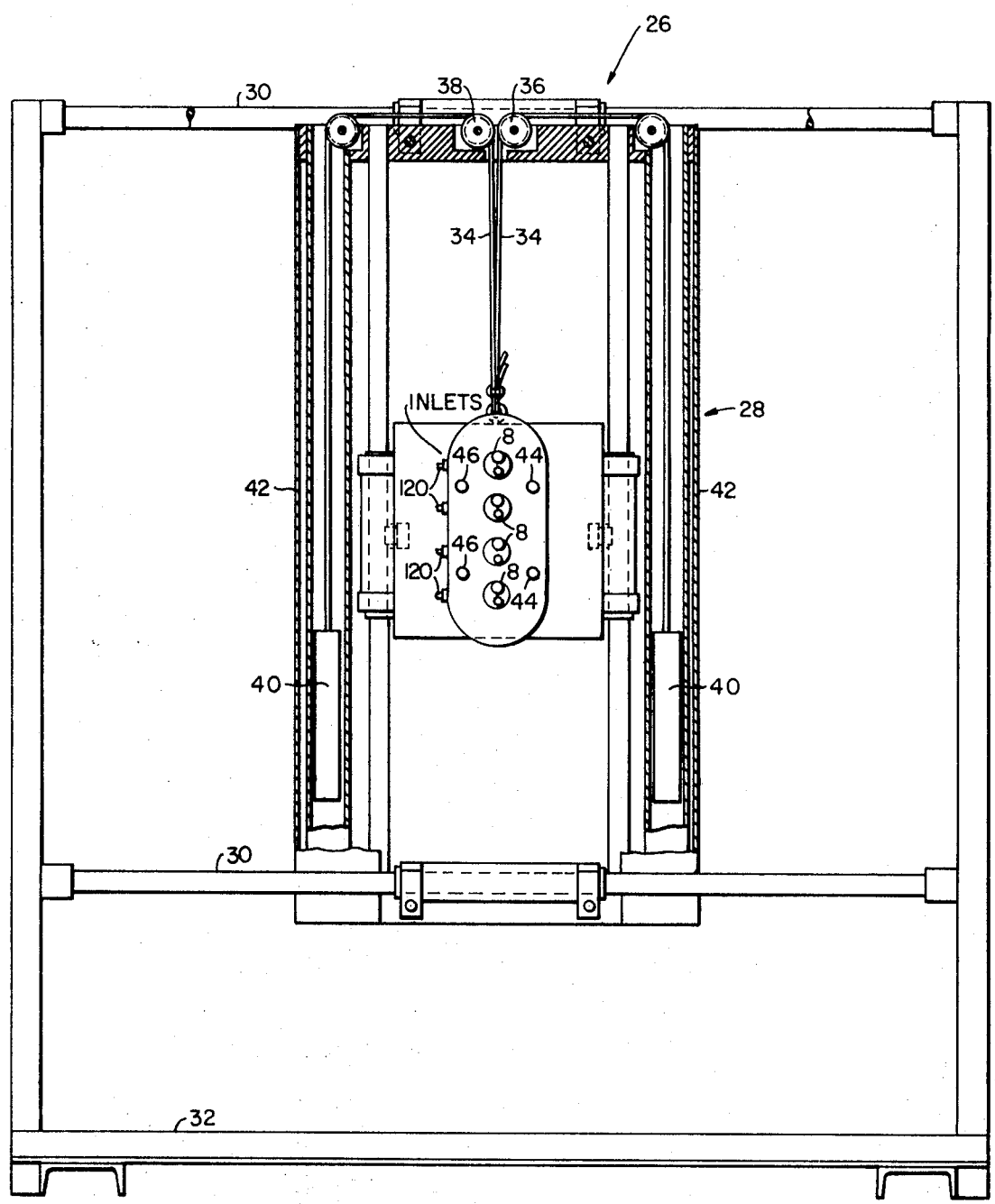
FIG. 4 is an elevational view showing the welding head carrier which positions the welding head for welding the tubes to a tube sheet; and, FIG. 5 is a side view of the welding head carrier supporting the welding head.
Figure 5:
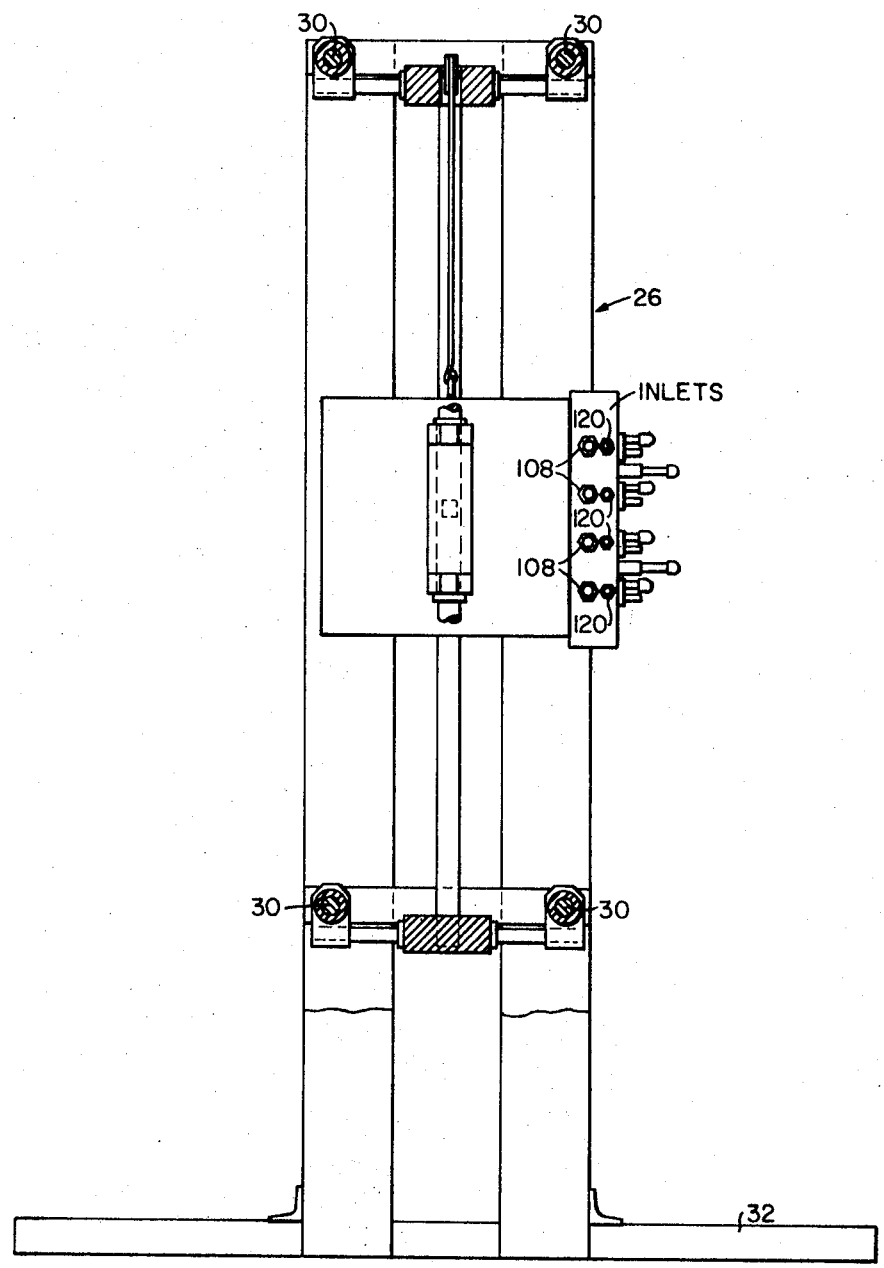

As shown, the welding head 1 is provided with four vertically arranged spindles 8 which have their axes spaced apart a distance equal to the spacing of the holes in the tube sheet 24. The supporting frame 26 for the head 1 as is shown more particularly in FIGS. 4 and 5 comprises a horizontally movable frame 28 slidably carried by horizontally arranged pairs of upper and lower rods 30. The rods 30 are carried by a suitable support 32 which may be fixedly positioned relative to the tube sheet 24. The head 1 is suspended for vertical movement by a pair of counterweighted cables 34 which extend over sheaves 36 and 38 and have their counter-weights 40 located within hollow legs 42 of the horizontally movable frame 28.

The four vertically arranged spindles 8 have their axes of rotation spaced apart a distance equal to an integral multiple of the vertical center to center spacing of the holes in the tube sheet 24 so that the head may be positioned with the axes of rotation of the spindles 8 approximately aligned with the center of four vertically spaced holes in the tube sheet 24. As is illustrated, the spindles 8 are spaced apart a distance equal to two times the hole spacing.

In order to accurately position the welding head relative to the tube sheet, the head is provided with two pairs of spaced locators 44 and 46. The locators 44 and 46 of each pair are vertically spaced apart a distance equal to four times the vertical center to center spacing of the holes in the tube sheet 24 and the pairs of locators 44 and 46 are horizontally spaced apart a distance equal to four times the horizontal center to center spacing of the holes in the tube sheet 24.

The pairs of locators 44 and 46 are slidably carried by the head 1 and are horizontally movable outwardly of the head 1 so that their bifurcated outer end portions 48 enter the end portions of the tubes 22, as shown, to accurately align the head 1 with the tube sheet 24. The pair of locators 44 are connected to a common member 50 which is actuated by a double acting piston and cylinder combination 52 suitably controlled by the control mechanism 54. Similarly the pair of locators 46 is actuated by a piston and cylinder combination 52A and a common member 50A.

Each of the spindles 8 is identical and is identically carried by the head 1 and in the interests of brevity only one thereof will be described in detail and for this purpose attention will be primarily focused on FIG. 1. The spindle 8 is fabricated of electrically conducting material and is journaled for rotation within a cylindrical chamber 56 which opens outwardly through the surface 58 of the housing 6 adjacent the wall 4 and which has a reduced diameter circular aperture 60 opening outwardly through the outer wall 62 of the housing 6. The spindle 8 is provided with a central portion 64 which is shouldered at both ends to receive the bearings 66 which rest against spaced portions of the wall 67 of the chamber 56. If desired, an annular sleeve 68 may be provided to line the chamber 56 and to provide a pair of axially spaced shoulders against which the spaced sealing member 70 are adopted to seat. The sealing members 70 seal against the outer surface of the spindle 8 and thereby provide a fluid chamber 72 which, as will be discussed further below, contains an electrically conducting liquid such as mercury.

The end portion of the spindle 8 comprises a first cylindrical part 74 which substantially fills the aperture 60 and which may be integral with the portion of the spindle 8 supported by the bearings 66. This spindle part 74 may have its end surface in substantial alignment with the outer surface of the wall 62 and be provided with an axially extending chamber 76 which preferably extends axially with the spindle at least the thickness of the wall 62. The part 74 is provided with a peripheral groove 78 which communicates with the chamber 76 through radially extending passageways 80. The housing 6 is provided with a passageway 82 which is in radial alignment with the groove 78 for the flow of fluid to the groove 78 and chamber 76.

Figure 2:
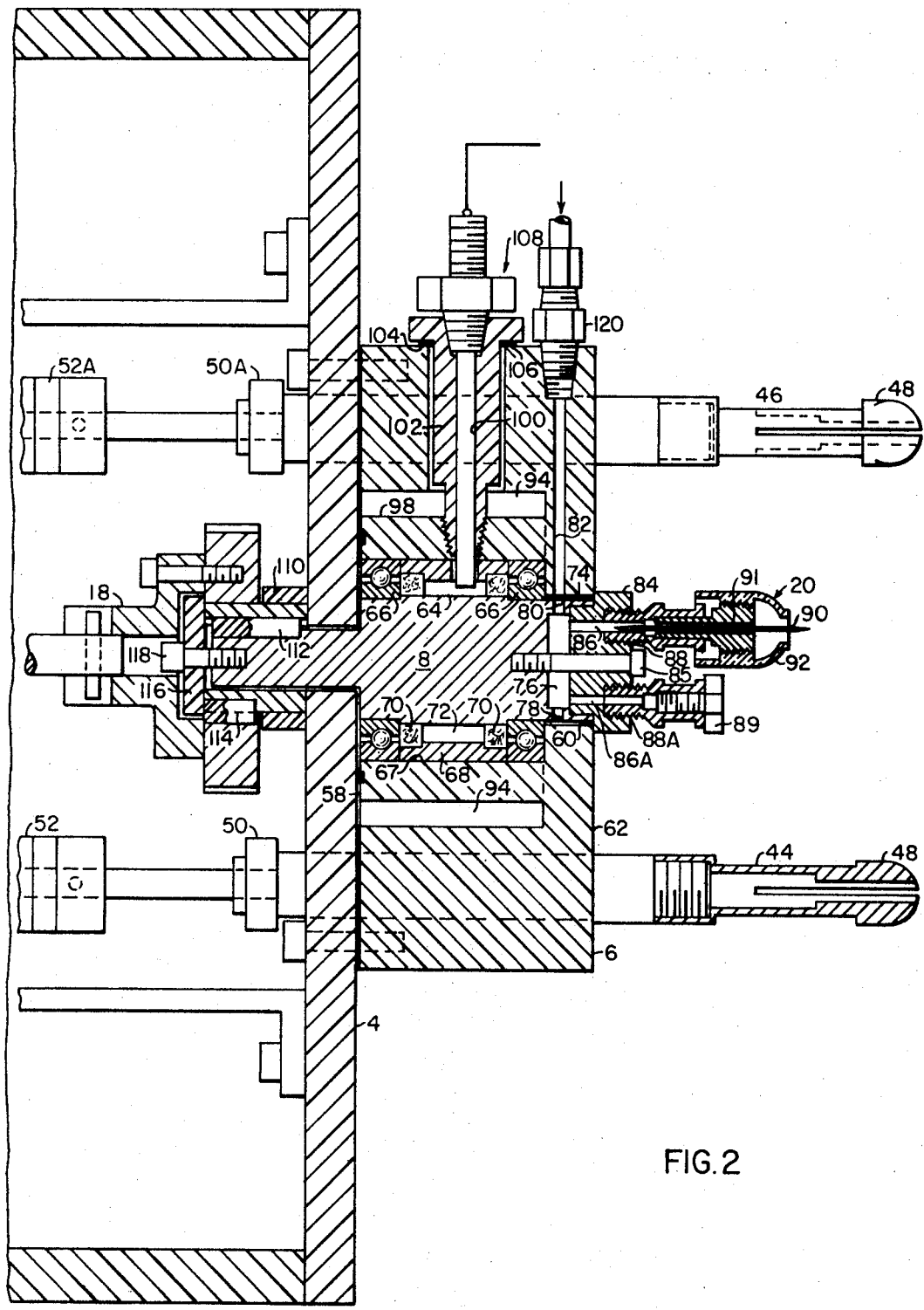
FIG. 2 is a sectional view taken substantially along the lines II—II of FIG. 1 looking in the direction of the arrows.
Figure 3:
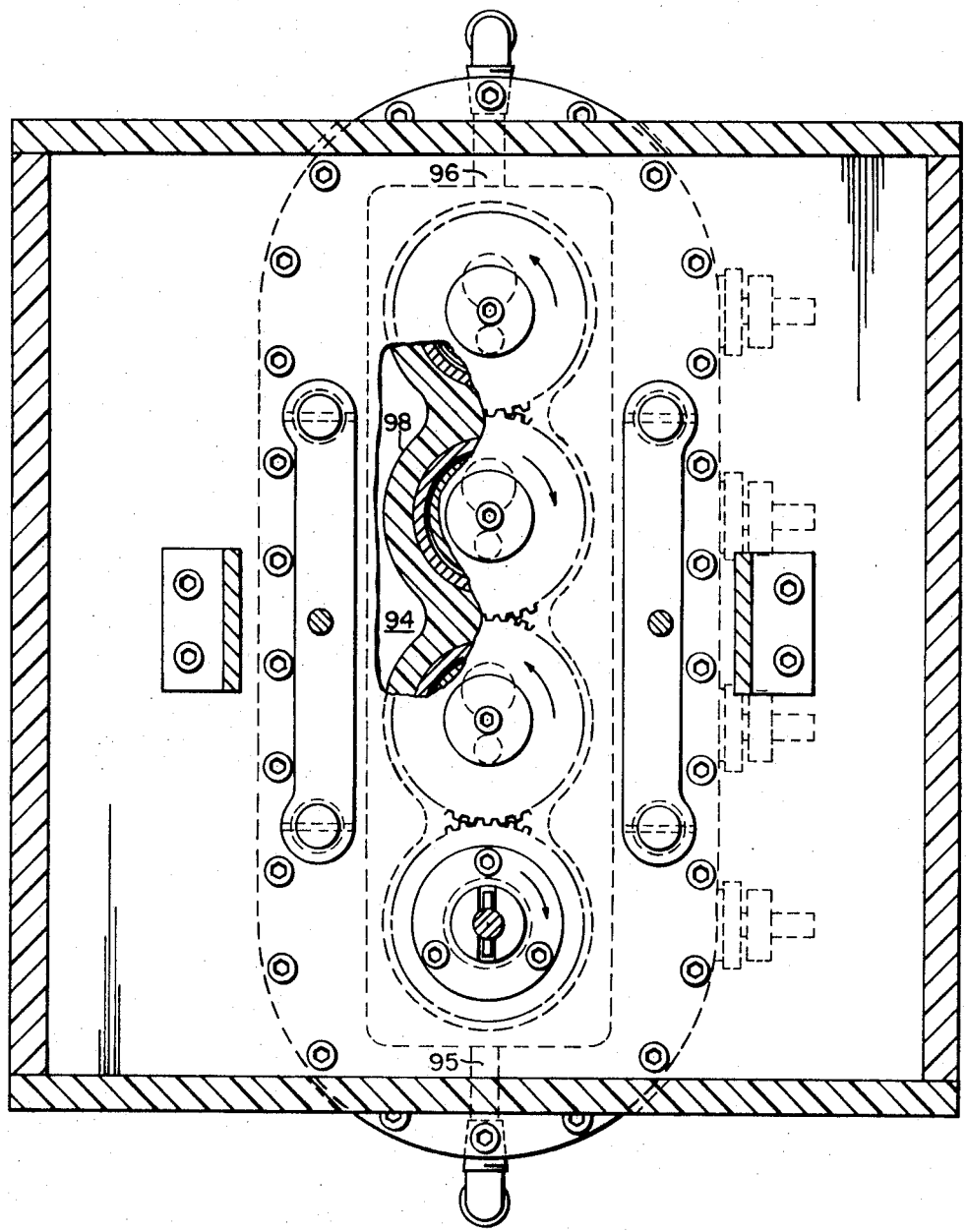
FIG. 3 is a sectional view taken substantially along the line III—III of FIG. 1 looking in the direction of the arrows.

The spindle 8 further comprises a shouldered cap member 84 which closes the outer open end of the chamber 76 and because of the close proximity of its shoulder to the wall 62 prevents any substantial flow of fluid outwardly along the aperture 60. The cap member 84 is provided with a passageway 86 having an outer threaded portion 88 into which the TIG welding head 20 is threaded. As discussed previously the passageway 86 is radially spaced from the axis of rotation of the spindle by a distance which is approximately the radius of the hole in the tube sheet 24. The TIG welding heads 20 are commercially available and include a tungsten arcing member 90 and a fluid flow passageway 91 for flow of an inert welding gas from the chamber 76 into the head cap 92 from whence the gas flows annularly about the member 90. If desired the member 84 may be provided with a second passageway 86A spaced outwardly a different radial dimension to permit the use of the head 1 with tubes 22 of a different size. The passageway 86A is provided with an outer threaded portion 88A and the one of the passageways 86 and 86A which is not used and which shown as 86A in FIG. 2 is closed by a plug 89.

The housing 6 is provided with a coolant chamber 94 having inlet and outlet passageways 95 and 96. The chamber 94 is separated from the chamber 56 by an inner wall 98. Access to the chamber 72 is obtained by means of a passageway 100 extending through a plug 102. The plug 102 as illustrated is screw threaded to the wall 98 and has a shoulder 104 which compresses a gasket 106 against the adjacent outer surface of the housing 6. The passageway 100 is used to fill the chamber 72 with the liquid mercury. Thereafter it is closed by a current conducting plug 108 screw threaded within the outer end of the passageway 100 and having a current conductor portion extending into the chamber 94 where it contacts the current conducting liquid therein. As illustrated, the plug 108 enters the chamber 72 substantially midway vertically of the chamber so that it is not necessary to completely fill the chamber 72 with mercury.

The gear 14 is insulated from the conducting spindle 10 by means of insulating sleeve or bushing 110 which is keyed thereto by an insulating key 112. The gear 14 is keyed to the sleeve with an insulating key 114. The gear is prevented for axial movement from the spindle 10 by an insulating disk 116 which is held to the spindle 10 by a screw 118 which is either of insulating material or which is sufficiently spaced from the coupling 18 to be electrically isolated therefrom.

The remaining details of construction may best be understood from a description of operation of the welding head 1 as it may be used to weld tubes to tube sheets. The tube sheet 24 has its holes aligned in rows which are mutually perpendicular. As used herein these rows will be discussed as being horizontal and vertical as will be the mutual perpendicular movement of the parts of the frame 26. It is to be understood, however, that horizontal and perpendicular are intended to represent the two mutually perpendicular directions and need not be, but usually are, horizontal and vertical.

The welding head 1 is moved to one edge of the tube sheet with one of its spindles 10 substantially aligned with an outermost horizontal hole in the tube sheet. Since the periphery of the tube sheet is normally round only one of the spindles will be aligned with a hole and only one of the pairs of locators will be aligned with other horizontally and vertically inwardly spaced holes in the tube sheet 24. For this reason, the piston and cylinder combinations 52 and 52A are individually controlled and in this case only one thereof need be actuated. Upon actuation the associated pair of locators is moved outwardly and into the tube ends within the holes with which they are approximately aligned to accurately align the spindle 10 with the tube-sheet hole.

Each of the spindles 10 preferably is energized from a separate power supply by a conductor (not shown) connecting such supply to the associated one of the conductor plugs 108. Also since the spindles 10 are individually controlled, the inert gas lines (not shown) are connected to the inlet fittings 120 which are associated with the gas passageway 82. The flow of gas to the passageway 82 is individually controlled. With this arrangement, only the gas and electrical energy need be supplied to TIG head 20 which is adjacent a tube 22 to be welded. It will be understood that as head 1 is moved inwardly the number of TIG heads 20 used at one time will increase to four. Coolant such as water is passed through the chamber 94 between the inlet and outlet passageways 95 and 96 during the welding operation to cool the parts.

The mercury or other electrical conducting liquid makes contact between the current conducting plug 108 and the spindle 8. Similarly, the inert gas used for TIG welding, flows through the passageway 82 in the welding head 1 into the groove 78, and through the passageways 80 and 91. With this arrangement the rotation of the spindles 8 is unimpeded by any conductors or gas hoses connected thereto.

What is claimed and desired to be protected by United States Letters Patents is as follows:

1. A welding mechanism for making circular welds on a workpiece, said mechanism comprising a housing of electrically insulating material having a first chamber having a peripheral surface, said housing having an outer wall with an opening leading through said wall and to said chamber, a rotatable spindle of electrically conducting material having an axis of rotation and a cross-sectional area perpendicular to said axis which is less than the cross-sectional area of said chamber to provide an annular space, bearing means carried by said housing and journaling said spindle for rotation about its said axis, means sealing the annular space between said spindle and said housing at axially spaced portions along said spindle to provide a second chamber surrounding said spindle, an electrically conducting liquid in said second chamber, an electrically conducting arcing portion carried by a first portion of said spindle outwardly of said wall, said arcing portion being spaced radially outwardly of the axis of rotation of said spindle, an electrical conductor leading into said housing and terminating in electrical conducting relation with said liquid, holding means associated with said housing and arranged to hold said housing against movement relative to the workpiece whereby said conductor is prevented from rotating with said spindle during the making of a circular weld, and means for rotating said spindle about said axis thereby causing said arcing portion to traverse a circular path.

2. The combination of claim 1 in which said spindle is provided with a third chamber isolated from said second chamber, said housing being provided with a first passageway leading into said third chamber for the flow of shielding gas thereto, said spindle being provided with a second passageway leading from said third chamber and opening outwardly of said spindle adjacent said arcing portion to supply said shielding gas to said arcing portion.

3. The combination of claim 2 in which said holding means comprises extendable and retractable locating means adapted to engage said workpiece and locate said housing relative thereto to determine the path of an arc between said arcing portion and said workpiece.

4. The combination of claim 3 in which said housing is provided with a coolant chamber separated from said second chamber by an inner wall, said housing being provided with inlet and outlet passageway for the flow of a coolant to and from said coolant chamber.

5. The combination of claim 4 in which said first portion of said spindle has a part thereof which extends at least partially through said one wall, said third chamber being aligned with said one wall, said first portion being of lesser cross-section than the cross-section of the axial opening through said outer wall, said first passageway comprising means cooperable with said housing and said spindle to define a fifth chamber between said one wall and said part of said first portion, a portion of said first passageway being in said first portion of said spindle and interconnecting said third and said fifth chambers.

6. A welding mechanism for making circular welds on a workpiece, said mechanism comprising a housing of electrically insulating material, holding means carried by said housing and engageable with said workpiece to hold said housing against movement relative thereto during the making of a circular weld, said housing having spaced substantially parallel first and second outer surfaces, said housing have a first circular cylindrical chamber opening outwardly through said first surface, said chamber having a peripheral wall and being of a first diameter, said chamber terminating inwardly of said second surface to provide an end wall for said chamber, said end wall having a circular aperture extending therethrough, said aperture being of a second diameter, said second diameter being lesser in magnitude than said first diameter, a spindle having an axis of rotation and having a first circular peripheral circumference of a less diameter than said first diameter, bearing means located in said chamber and supported by said peripheral wall, said bearing means rotatably supporting said spindle, axially spaced sealing members sealing spaced portions of said chamber between said member and said spindle to provide a second fluid chamber within said first chamber and exteriorly of said spindle, said housing being provided with an access passageway leading into said second chamber whereby a liquid conducting medium may be supplied to said second chamber from the exterior of said housing, an electrode extending through and sealing said access passageway, said cover member having an aperture therethrough, means sealing said cover member to said first surface with said cover member aperture axially aligned with said first chamber, said spindle having an extension extending outwardly through said cover member aperture, an elongated member supported by said spindle at a point spaced radially outwardly of its said axis, an arcing member carried by said elongated member at its end portion spaced away from said spindle, and passageway means for flow of shielding gas, said last-named passageway extending from a point on the exterior surface of said housing through said housing and through said spindle and through said elongated member, said last-named passageway terminating adjacent said arcing member whereby said gas is supplied thereto.

7. The combination of claim 6 in which said spindle includes a third chamber located at least in part in alignment with said end wall, said third chamber being a portion of said passageway means.

8. The combination of claim 7 in which at least a portion of said passageway means extends through said end wall and opens into said end wall aperture, said spindle having an inwardly facing shoulder cooperable with said second surface to form at least a partial seal to retard the escape of fluid outwardly of said end wall aperture past said spindle.

9. The combination of claim 8 in which said housing includes a fourth chamber for coolant separated from said first chamber by an inner wall, said fourth chamber opening outwardly through said first surface, said cover member being sealed to said first surface to seal the opening of said fourth chamber through said first surface, said housing having inlet and outlet passageways for the flow of coolant to and from said fourth chamber.

10. A welding apparatus for welding circularly shaped tubes to tube sheets, said apparatus comprising a housing of electrically non-conducting material having first and second spaced outer walls, holding means carried by said housing and insertable into at least one of the tubes to be welded to locate said housing relative to a plurality of other of the said tubes and to prevent movement of said housing relative to said other tubes during the welding of said other tubes to said tube sheet, said housing having a hollow portion providing a coolant chamber, said housing having an interior wall structure located between said outer walls in heat exchange relation with said coolant chamber, said interior structure being provided with a plurality of spaced apertures, each said aperture having a first portion intermediate said outer walls and a second portion opening outwardly through said first outer wall and a third portion opening outwardly through said second outer wall, a plurality of spindles of electrically conducting material, said spindles being individual to and axially rotatable in said spaced apertures, each said spindle having a first portion located within the said first portion of the said spaced aperture with which it is associated, said spindle first portion being of a lesser cross-sectional area than the said aperture first portion with which it is associated to provide an annular space therebetween, a pair of axially spaced sealing rings in each said annular space, each said pair of rings cooperating with the said respective first spindle portion and the said aperture portion with which they are associated to provide end walls for the associated said annular space to provide a plurality of individual liquid containing chambers individually associated with said spindles, each said spindle having a second portion extending through said second portion of the said aperture with which it is associated, drive means associated with said second portions of said spindles for concurrently rotating said spindles, each said spindle having a third portion extending through the said third portion of the said aperture with which it is associated, a plurality of arcing elements, said arcing elements being located exteriorly of said second outer wall and individually carried by said third portions of said spindles and radially spaced from the axis of rotation of the said spindle with which it is associated whereby the locus of the outer end portion of each said arcing element is a circle having its center aligned with the center of the one of the said other tubes on which it is to perform a welding operation, each said liquid chamber containing an electrically conducting liquid, and a plurality of current conducting elements carried by said housing and having outer electrical terminals exteriorly of said housing, said plural current conducting elements being in individual electrical connection with the conducting liquid in said liquid containing chambers, said housing having an inlet and an outlet passageway to said coolant chamber.

* * * * *